United States Patent [19]
Brown et al.

[11] Patent Number: 5,738,785
[45] Date of Patent: Apr. 14, 1998

[54] OIL FILTER HOUSING

[75] Inventors: Gene W. Brown; Jeffrey E. D. Rogers, both of Kearney, Nebr.

[73] Assignee: Baldwin Filters, Inc., Kearney, Nebr.

[21] Appl. No.: 575,625

[22] Filed: Dec. 20, 1995

[51] Int. Cl.$^6$ ................................................. B01D 35/30
[52] U.S. Cl. ........................ 210/232; 210/248; 210/342;
210/440; 210/441; 210/450; 210/456
[58] Field of Search ................................. 210/168, 232,
210/248, 342, 438, 440, 443–445, 450,
453, 456, 457, DIG. 13, 441, DIG. 17;
123/196 A; 220/601, 615, 617, 619–621,
641

[56] References Cited

U.S. PATENT DOCUMENTS

| | | | |
|---|---|---|---|
| 3,307,705 | 3/1967 | Halmenschlager | 220/620 |
| 4,126,559 | 11/1978 | Cooper | 210/445 |
| 4,692,245 | 9/1987 | Church et al. | 210/232 |
| 5,080,787 | 1/1992 | Brown et al. | 210/232 |
| 5,118,417 | 6/1992 | Deibel | 210/441 |
| 5,342,511 | 8/1994 | Brown et al. | 210/342 |

FOREIGN PATENT DOCUMENTS

3738718  7/1988  Germany ............................ 210/232

*Primary Examiner*—Matthew O. Savage
*Attorney, Agent, or Firm*—Leydig, Voit & Mayer, Ltd.

[57] ABSTRACT

A housing system for a removable filter cartridge in an automotive lubrication system. The housing is formed of a thin-walled sheet metal drawn cylinder, with end removed, to form an elongated cylinder with both ends open. A base end has a formed metallic base secured therein by a rolled flange in the sheet metal housing. A closure end has a formed threaded ring secured to the end thereof by another rolled and swaged connection between the sheet metal and formed ring. In the preferred embodiment, the base carries permanent center tubes, and the filter cartridge is of unsupported construction, containing no metallic supports, and adapted to be disposed of in an environmentally acceptable manner.

17 Claims, 4 Drawing Sheets

OIL FILTER HOUSING

FIELD OF THE INVENTION

This invention relates to filters, and more particularly to an oil filter system employing a lightweight sheet metal housing and using a disposable filter cartridge.

BACKGROUND OF THE INVENTION

The lubrication system of the standard internal combustion engine requires periodic servicing multiple times per year. The servicing includes the changing of the lubricating oil and also the changing of the filter. Most high quality lubrication systems currently in use employ disposable spin-on oil filters, but these can create a disposal problem.

In the early days of filters, it had been common to utilize cartridge type oil filters which fit into a removable housing. The housing was removed from the oil filter mount on the engine, the cartridge removed from the housing, the housing cleaned, a new cartridge installed, and the housing with new cartridge then replaced on the engine. Cartridges for filters of that type usually included a cellulosic filtering medium and a supporting center tube, typically of metal mesh or expanded metal. Oftentimes, such cartridges also included an exterior metal support. The metal supports, and particularly the center tube (or outerwrap), were needed to prevent the filter from being crushed by the pressure generated in the lubricant being filtered. Differential oil pressures in an automotive hydraulic system can rise substantially at engine start-up, and particularly during malfunctions, such as a plugged filter malfunction (due, for example, to water or excess engine wear metals in the oil), and can reach 200 psi or more.

More modern automobiles have migrated to the spin-on filter. While the spin-on filter is typically more expensive, and creates a greater disposal problem, the simplicity of removing an old filter, then spinning a new one on in its place has driven the industry in that direction. The spin-on filter not only has the typical cellulosic filter elements, but also has an external shell of sheet metal, a center supporting tube, a threaded base plate and all the necessary structure to hold the filter in place and keep it from being crushed. After it is used, the entire spin-on filter, metal shell and all, must be discarded.

Environmental regulations, the limited availability of landfills, and the greater awareness on the part of the public with respect to landfill pollution have created the need for an oil filter of the type which can be safely disposed of in an environmentally acceptable way. These factors have rendered the canister type spin-on filter less than desirable, because they have a substantial metal content, along with the paper content, gasket content and residual oil.

Considering again the prior use of disposable filter cartridges with permanent housings, they also posed disadvantages, because their use was typically accompanied by the use of old style permanent housings which were typically of the center bolt concept. Past cartridge filter housings were made of either stamped steel or cast aluminum (typically—a few were cast iron). The previous stamped steel housings typically used a shell and bolt type of construction which used one gasket between the housing and the lid and another between the center bolt and the lid. In the past there were some cast designs which used a cast housing where the housing was threaded providing a means of attaching the lid to the housing and eliminating the center bolt and its attendant gasket. The problem with the cast concept is that it is expensive when compared to stamped steel—it naturally ends up with a higher material cost due to the think walls required when casting aluminum or iron. The expense factor caused most high volume cartridge designs to be of the shell and bolt (2 gasket) concept. The center bolt was typically used because it was difficult or expensive to make cast threads on the outside of a stamped steel housing and on the mating stamped steel lid. The use of two gaskets on the shell and bolt design made filter changes somewhat complicated.

An undesirable feature of past cartridge filters (shell and bolt type) was the two loose gaskets which were supplied with the cartridge, the larger gasket to be installed in a groove between the lid of the cartridge housing and the housing, and the smaller gasket to be placed between the flange on the center bolt and the lid. The large diameter loose gasket tended to be somewhat small in cross section and large in diameter and was typically supplied wrapped around the cartridge as shipped from the filter factory. The small diameter gasket was susceptible to being dropped and lost due to its small size. Further, the large diameter loose gasket susceptible to deformation prior to installation (it frequently was deformed when taken out of the box), thus made installation difficult. Another problem was untrained personnel changing filter cartridges and not knowing exactly where the loose gaskets fit, and further having difficulty seeing the area where they fit, due to the confined, cramped, and relatively inaccessible places where the filter was placed. Both gaskets had a further problem that a non-conscientious mechanic (or oil change person (could elect not to install one or both of the new gaskets when changing the cartridge, and just use the old ones over, thus nearly insuring leakage problems. The deformed large gasket, chances for the mechanic to use the old gaskets over, chances for dropping and losing the gaskets, and cramped spaces for the filters usually required a trained, conscientious specialist to change cartridge filters in order to make them leakproof. The spin-on filter simplified the filter change situation because the loose gasket problem, fitting deformed gaskets into grooves, dropping and losing gaskets, and the likelihood of using gaskets over was eliminated. The spin-on filter eliminated many leakage problems associated with the old cartridge filters. Thus, past cartridge filters had many problems, chiefly of installation and leakage, which the present invention is intended to resolve.

SUMMARY OF THE INVENTION

In view of the foregoing, it is a general aim of the present invention to provide a permanent housing for a disposable filter cartridge which is made primarily of stamped steel, and is thereby inexpensive and light weight. In that regard a further object is to eliminate the center bolt of the old designs thus simplifying filter changing and eliminating leakage problems due to the many problems mentioned above.

Another aim is to design a filter cartridge which has only one gasket which must be changed with the cartridge. A further objective of the invention is to make it impossible to reuse an old gasket with the cartridge, and to make the installation of the single gasket to be changed to be foolproof requiring no looking or feeling for a groove in which to place the gasket and also eliminate the deformed gasket problem of previous designs.

An object of the present invention is to provide a filter system for an internal combustion engine capable of using a disposable filter cartridge, and in which the major components of the housing are mounted on the engine as it would be manufactured as original equipment.

More detailed objects according to that aspect of the invention are to combine with such a shell in a filter of that type adequate components for rigidifying the shell to render it a truly permanent part of the engine itself.

In a more detailed aspect, an object is to provide such a filter system in which the housing includes permanent center tubes for support of otherwise unsupported filter cartridges.

Our concurrently filed application Ser. Nos. 08/575,515 and 08/575,833, pending, describe and claim an environmentally friendly filter system and a cartridge for such filter system which addresses the disposal problem. According to those disclosures, many of the elements of the filter which had been disposed of in the past can now be made permanent parts of the filter housing. The filter cartridge is configured to eliminate metallic parts, such as supporting tubes, and to use only materials in the filter cartridge which can be disposed of in a landfill or incinerated.

In connection with such a filter cartridge, it is an object to provide a permanent housing configured of modern sheet metal components rigidified to render them permanent and reusable for the life of the engine.

Other objects and advantages will become apparent with reference to the following detailed description when taken in conjunction with the drawings in which:

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENT

As shown in the drawings, for purposes of illustration, the invention is embodied in a filtration system 20 exemplified as an oil filtration system for an internal combustion engine.

Figure 1:
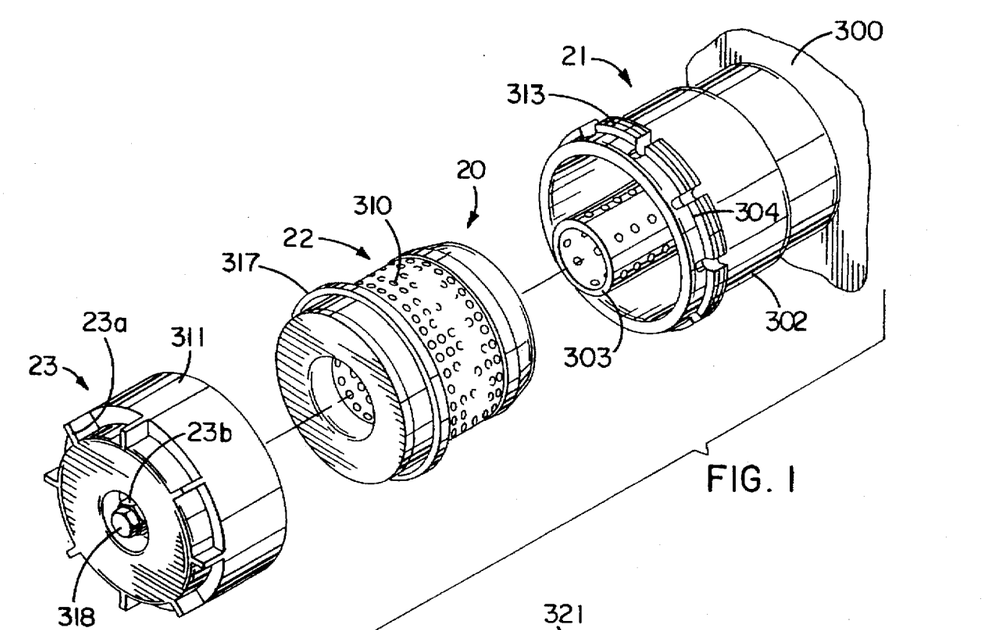
FIG. 1 is an exploded perspective showing a first embodiment of a filter system constructed in accordance with the present invention.

FIG. 1 shows the filter system 20 in exploded in perspective view as including three main groupings, a set of engine mounted components 21, a replaceable filter cartridge 22 and a cover assembly 23. An internal combustion engine is schematically illustrated at 300, and it will be seen that the engine mounted components 21 are fixedly secured to the engine 300. The filter cartridge 22 is inserted within the housing 21, the cover 23 placed over the open end after the filter cartridge is inserted, and rotated until the housing is in its closed and locked condition. The engine may then be operated and the oil flows through the housing 21 to be filtered by the cartridge filter 22.

Figure 2:
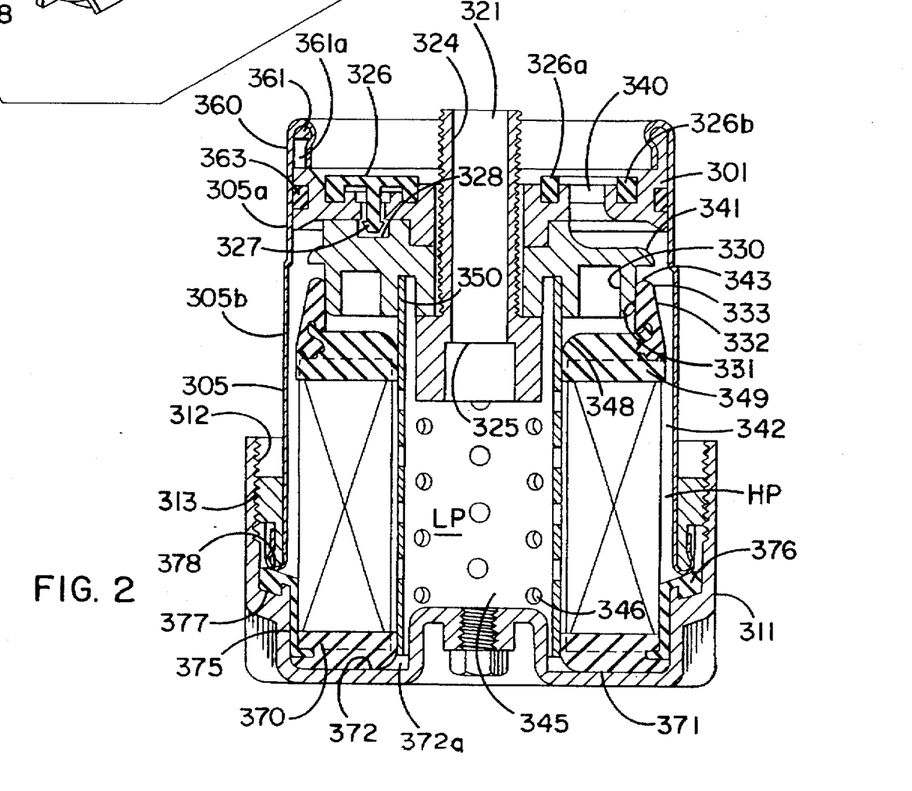
FIG. 2 is a cross-sectional view of the filter of FIG. 1 showing the filter system in assembled relationship.

In greater detail, and referring concurrently to FIGS. 1 and 2, it will be seen that an engine block diagrammatically illustrated at 300 has mounted thereon a filter housing 302 having an internal chamber sized to accept a filter cartridge 310. With the filter cartridge 310 inserted in place, a cover 311 is positioned over and tightened onto the housing 302. When it is desired to change the filter, only the cover 311 need be removed, and the filter cartridge 310 then extracted from the housing 302. The housing 302, in effect, forms a fixed part of the engine. In accordance with the invention, and as will be described below, the housing 302 is primarily a sheet metal member, which avoids the need for large size castings, but is adapted with structural elements which render the sheet metal housing quite rigid and permanent.

In the preferred practice of the invention, the housing has an internal permanent support tube 303, and the filter cartridge 310 is unsupported. Thus, when the filter 310 is positioned over the permanent center tube 303, radial support is provided to prevent radial crushing loads from affecting the unsupported filter media. As described in greater detail below, the gasketing arrangement associated with the filter cartridge protects the end caps of the filter from high pressure normally seen at the outer periphery thereof. As a result, the filter 310 is positioned to avoid axial crushing loads, and indeed, axial forces imposed on the media of the filter element tend to be tension loads rather than compression loads. The cover 311 is secured over a threaded flange 304 such that threads 313 permanent positioned on the housing 302 engage internal threads 312 to allow the cover to be screwed onto and locked to the housing.

Figure 3:
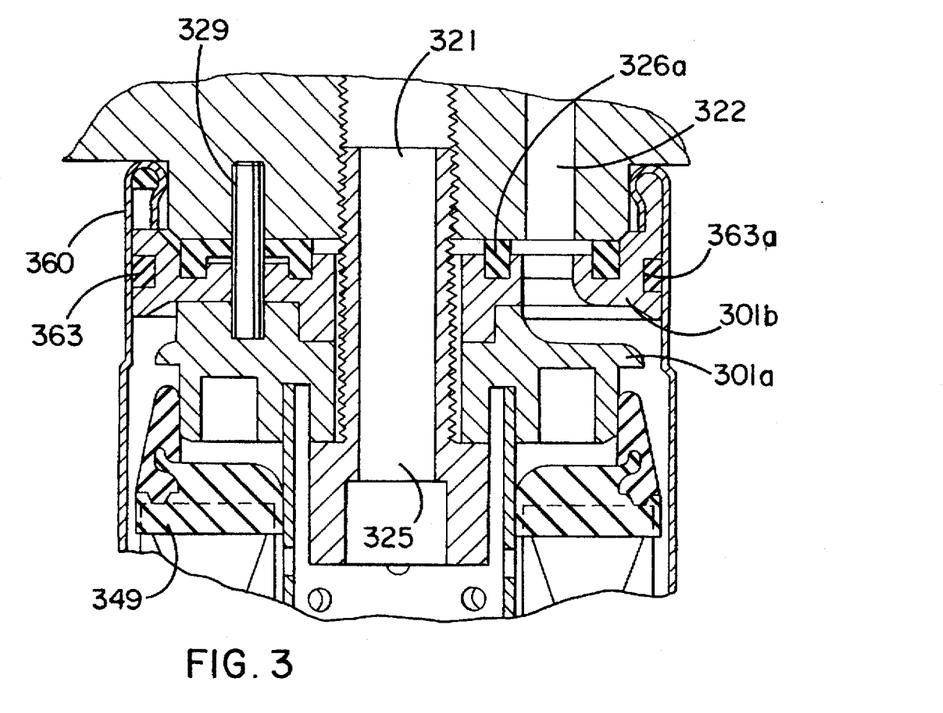
FIG. 3 is an enlarged partial view illustrated the interface between the filter and associated engine.

Referring briefly to FIG. 3, there is shown in partly schematic form the primary elements of an engine mounting area which can be very simply machined to include one or more cored openings 322 for inlet oil flow to the filter, a central opening 321 for outlet oil flow to the engine, and a tapped hole in the opening 321 for securing the filter assembly thereto. A specially configured bolt 324 is provided having a central opening 325 therein to allow passage of oil through the bolt while the bolt secures the housing to the engine block. A gasket 326 with barbed posts 327 fitting within apertures 328 in the base plate 301 provides appropriate sealing of the filter housing to the engine block. The engine to housing gasket 326 provides a pair of sealing rings 326a, 326b which fluidically connect the aperture 322 in the engine block to an inlet port 340 in the base plate 301. An anti-rotation pin 329 (FIG. 3) secured to the base plate 301 and fitting within a cored aperture in the engine housing, is provided for preventing rotation of the filter housing when once properly installed on the engine.

The base plate 301 provides a cylindrical channel between the gasket rings 326a, 326b which communicates with a plurality or ports in the base plate, only one of which is shown, to direct oil flow past the flow diverter 341 into a chamber 342 between the inner periphery of the shell 305 and the outer periphery of the filter element 310. In order to facilitate manufacture, the base plate 301 is configured as a two-piece casting, preferable diecast aluminum, made up of lower section 301a, joined to upper section 301b, the sections preferably being joined by press fit or gluing.

As will be best seen in FIG. 2, the permanent center tube 303 is secured in an aperture in the base 301, particularly in the section 301b of the base. The center tube 303 may be of perforated plastic, but is preferably of perforated aluminum, and is secured in the appropriate cylindrical slot as by gluing.

The manner in which the shell 305 is fixed to the base 301 in order to rigidify the housing is of significance. First of all, it will be appreciated that the shell is preferably a thin-walled seamless tube formed by drawing. In the preferred embodiment, the housing is of steel with a wall thickness of about 0.050 inches. Two drawing operations are used to form the two diameter portions of the shell 305 illustrated in FIG. 2, a first portion to form the smaller diameter section 305a, and a separate drawing operation to form the larger diameter section 305b. The end of the can is removed, creating open ends at both axial ends of the shell. At the base end, below the point illustrated at 360, the sheet metal shell is rolled around a flange 361 of the end plate 301. The flange 361 can have several small apertures therein, one of which is illustrated at 361a so that the sheet metal can be swaged at the apertures to form indentations at the aperture 361a, to prevent the shell from rotating on the flange. The flange of the base 301 is a continuous cylindrical flange (with the exception of the apertures 361a) so that the rolled edge 360 is in crimping engagement with the flange around the entire periphery thereof. An O-ring or square cross section round gasket 363 positioned in a slot 363a of the base 301 seals the housing from leakage past the flange. The smaller diameter section 305a of the shell 305 closely fits the external diameter of the base 301, with the O-ring gasket 363 compressed, following which the shell is rolled at 360 over the flange 361 to secure those elements together. By virtue of the strength and rigidity of the cast flange 361, the base portion of the shell is substantially rigidified.

The flange on the base plate 361 has a "bulge" at the end. The shell is formed over this "bulge" to provide axial fixing of the shell on the base plate. There are a plurality of holes 361a in the base plate just below the "bulge". The shell is swaged into these holes in order to fix the shell to the base plate from a torsional standpoint. The attachment of the cover 311 to the shell 305 imposes axial and torsional loads on the shell. The aforementioned "bulge" and swaging of the shell into holes resists the imposed loads from the cover attachment.

Figures 5, 6, 9:
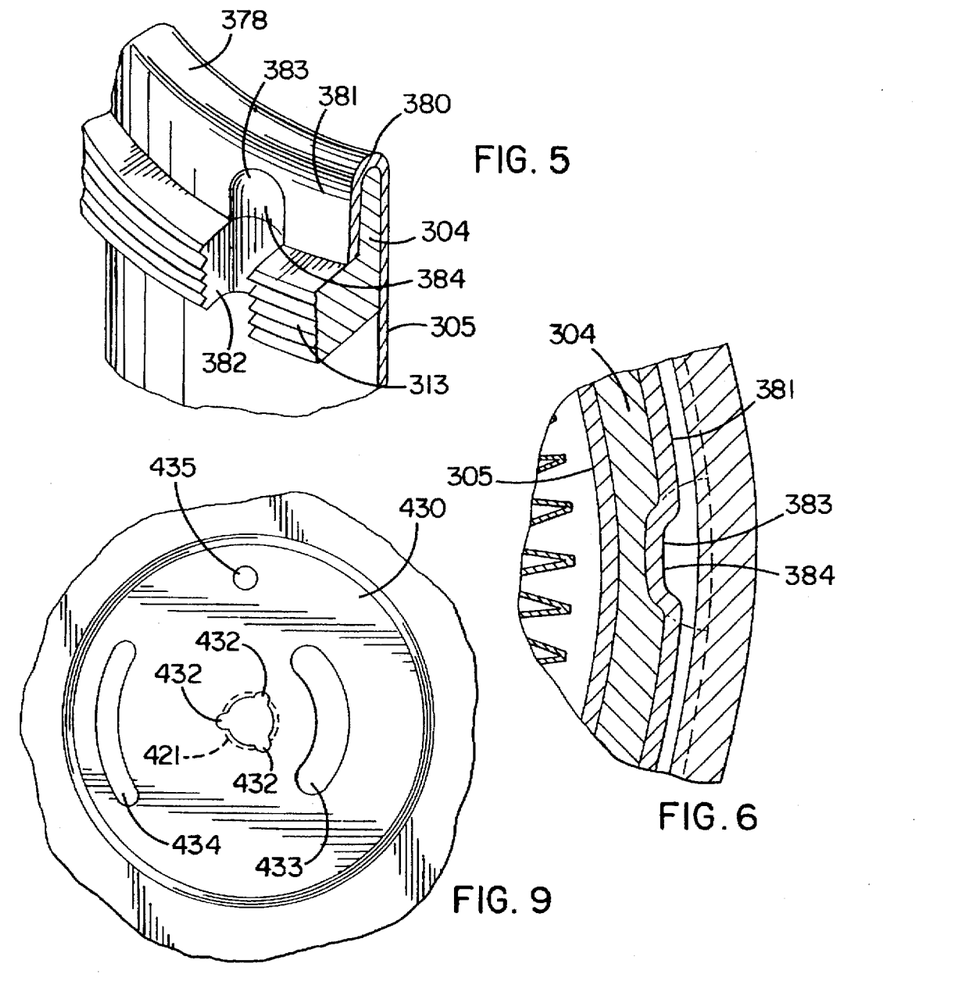
FIG. 5 is an enlarged fragmentary perspective showing the interconnection between the threaded ring on the filter housing and the sheet metal shell.
FIG. 6 is a fragmentary sectional view taken along the line 6—6 of FIG. 4 also showing the interrelationship between the sheet metal shell and threaded ring.
FIG. 9 is a plan view taken along the line 9—9 of FIG. 8 showing the configuration of the engine needed to mount the oil filter of FIG. 8.

Similar rigidity is provided to the open end of the shell 305 by a further cast member which comprises a threaded ring 304. It will be seen in FIG. 5 that the threaded ring 304 also has an annular flange 380 over which an end portion 381 of the shell 305 is rolled to form a shoulder 378. The rolled edge is continuous around the periphery of the shell. As will be appreciated from FIG. 1 and as illustrated in greater detail in FIG. 5, at a plurality of angular positions around the threaded ring 304, there are formed a plurality of indents 382 which provide a segmented opening in the thread 311 and also an indented section 383 in the exterior portion of the flange 380. As will also be seen in FIG. 5, after the end 381 is rolled over the flange 313, the shell is swaged at 384 to closely conform to the indent 383. FIG. 6 provides a further view of the indentation 384 formed in the shell 305 at the indent section 383 to provide an anti-rotation feature fixing the threaded ring 304 in fixed angular position on the shell 305. By virtue of performing the swaging operation at a plurality of locations around the periphery of the ring 304, the ring is securely affixed to the shell, not only in an axial direction, but also rotationally. It will be appreciated that the cover is threaded onto the ring 313, and there are times when excessive torque will likely be applied to the cover, with the possibility of rotating the ring with respect to the shell. However, by virtue of the anti-rotation swaged connections just described, the ring is secured in an anti-rotation sense to the shell, avoiding damage by that mechanism. Thus, the ring, which, like the base, is a cast member, provides rigidity to the open end of the housing formed by the sheet metal shell 305. It also provides a reliable thread of cast metal adapted to fit with the internal threaded section of the cover, also cast, to provide the ruggedness and reliability of an overall cast assembly, but at substantially reduced weight and substantially reduced cost.

While a housing constructed in accordance with the present invention can be used with conventional supported filter cartridges, which carry their own supporting center tube, and conventional gasketing arrangements suitable for those filter cartridges can be used, it is preferred to utilize a disposable filter cartridge as described in the aforementioned copending applications. When an unsupported filter cartridge is utilized, it is preferred to gasket that filter cartridge according to the aforementioned applications so that compressive axial loads on the filter media are avoided. Thus, as illustrated in FIG. 2, the base plate 301 includes a cylindrical flange 330 sized to mate with a flat surface 331 of a radial seal 332. The radial seal has a rounded nose 333 for facilitating insertion of the filter element into the housing. A flow diverter 341 in the inlet port diverts the flow into an outer cylindrical chamber 342 while avoiding direct impingement onto the interface 343 between the nose 333 of the radial seal and the flange 332 of the housing. A high pressure zone in the outer cylindrical chamber 342 forces flow to a lower pressure zone LP in the central cylindrical chamber 345 within the permanent center tube 346. It will also be seen that the low pressure zone LP appears at the upper surface 348 of the end cap 349 formed in the filter element 310.

By virtue of the radial sealing gasket 332 positioned at the outer periphery of the filter cartridge, the end cap 349 is protected from the higher pressure HP which appears at the outer periphery, and is exposed only to the lower pressure LP which is present at the interior of the filter media. Thus, it will be seen that the upper portion 349 of the upper end cap is in a chamber connected to the LP region in the center tube. As such, there is no high pressure applied to the end cap which is capable of imposing a compressive axial force on the filter media. Indeed, the high pressure acts only against the outer surface 332 of the axial seal, causing the flattened portion 331 to press against and seal with the cylindrical flange 330.

Turning to the gasket at the other end, while a similar radial seal can be provided, we have employed an axial seal to seal between the lid and the housing. The low pressure from the downstream side of the filter is allowed at the interface at 371. The differential pressure creates a force which pushes the end cap 370 against an annular sealing surface 372 of the cover 311. This does not create a problem as the cover and threads on the cover are sufficiently strong to resist this force. This pushing of the cartridge against the cover means that there will always be a clearance between the end of the radial seal 333 and the flow diverter 341. However, this is necessary in order to assure that the gasket 376 is compressed when the cover is torqued onto the housing and the cartridge is not providing axial resistance to the cover tightening. If this were allowed to occur, the gasket 376 may not be compressed sufficiently and the filter might leak.

Figure 4:
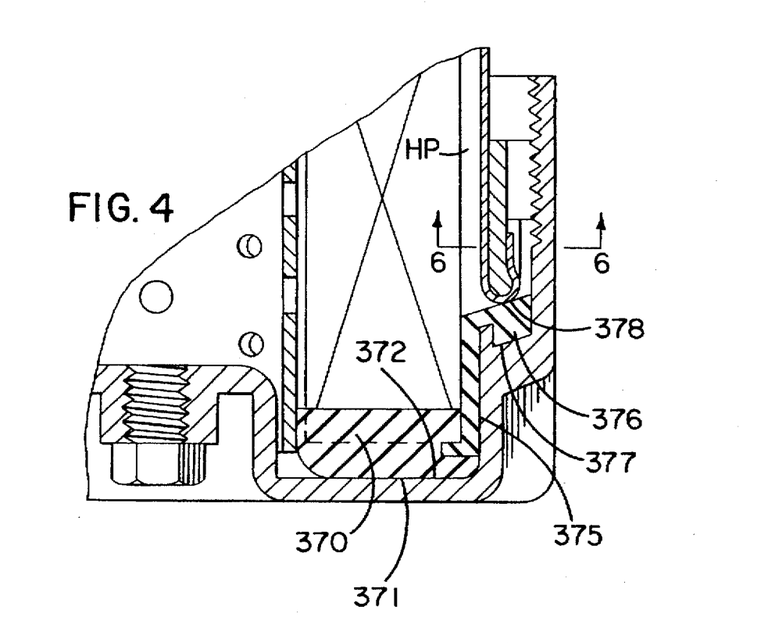
FIG. 4 is a partial enlarged view showing the axial seal at the cover end of the filter.

It is important to note that the flange 375 also carries a housing gasket 376 which is adapted to automatically position itself and provide a housing seal when the cover is secured to the shell. Thus, the gasket 376 is suspended about the outer periphery of the filter media, and at a position such that when the filter cartridge 22 is inserted into the housing 21, the gasket 376 will come into contact with the rolled edge 378 of the shell 305. Furthermore, when the cover 311 is placed over the shell 305 and turned in a tightening direction, the surface 377 of the cover will come into contact with the lower portion of the gasket 376, compressing the gasket between the surfaces 377, 378. It is also worth of note that carrying a suspended gasket as is taught in the present embodiment makes the filter cartridge 22 unidirectional. The cartridge will fit into the housing in one direction only, since the suspended gasket is too large for the opening in the housing. Thus, the assembly is virtually foolproof, in that the cartridge can be inserted in one way only, and the gasket 376 is automatically positioned when the cover is brought into place.

By attaching the gasket 376 to the cartridge, it is impossible for the mechanic to reuse an old gasket, to drop and lose the gasket. It also prevents the gasket from being deformed when packaged or when warehoused. The entire geometry of the housing and the cartridge and integral gasket automatically positions the gasket in the proper place for installation into the housing. The integral gasket allows easy packaging of the cartridge filter to assure it stays round and flat. The axial seal gasket is used with the invention to make the cover easy to remove and install. This axial seal approach is far superior to using a radial seal at the cover/housing interface in terms of keeping the torque level low for removal and installation of the cover. All of these features of the invention make it like a spin-on filter in its ease of installation. The characteristics of the invention makes it nearly impossible to improperly install the cartridge into the housing and this factor is considered highly advantageous when considering the likelihood of untrained personnel changing filters and the high costs associated with leaking filters in terms of harming expensive equipment and causing environmental problems.

It is also worthy of note that the embodiment includes a drain plug 318 in the cover 311. The drain plug is important in a filter arrangement as illustrated since removal of the cover will likely release a larger quantity of oil than can be carried by the cover. Thus, in normal operation, it may be preferable to first remove the drain valve 318, and allow the oil to drain from the filter cartridge, before removing the lid. The filter cartridge 22 is then removed, a new filter cartridge installed over the center tube, and the lid replaced, which completes the filter change.

To aid in removing and securing the cover, the outer periphery is provided with a plurality of finger tabs 23a, and a central boss 23b is provided with a hex configuration. Thus, the filter cover can be removed by using the finger tabs 23a, or a socket of a size adequate to fit the hex boss 23b. Indeed, even a standard filter wrench can be used if desired, although that is believed to be less convenient. However, due to the cast nature of the cover, it is not likely that damage will result even when using a filter wrench.

Figure 7:
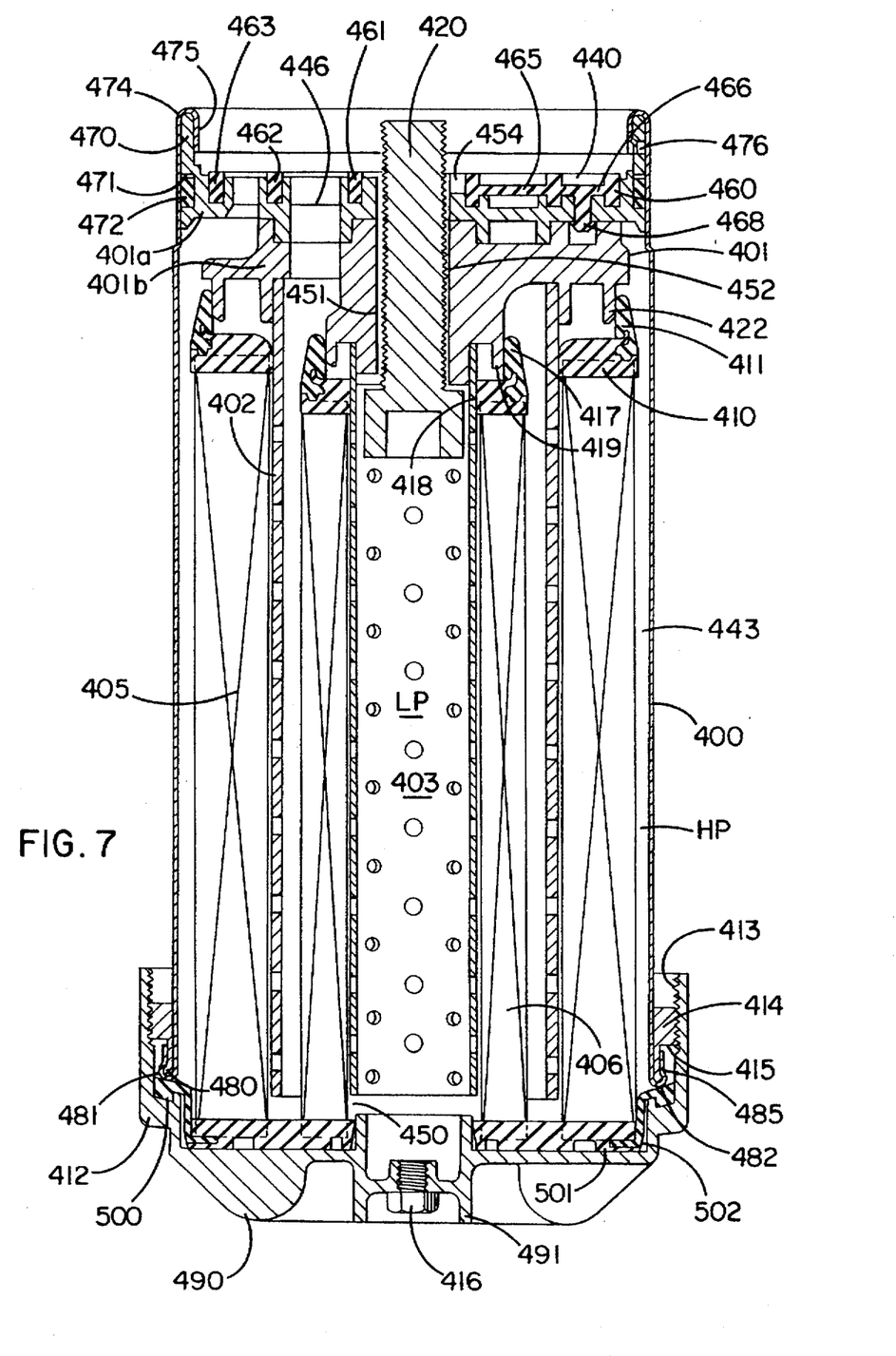
FIG. 7 is a cross-sectional view of a second embodiment of the present invention showing a filter system having two filter elements, sometimes referred to as a dual flow filter.

FIG. 7 is a view similar to FIG. 2, and illustrating another embodiment, currently preferred, of the present invention. The embodiment is preferred primarily because it takes greater advantage of the positive attributes of the invention than does the first embodiment.

The filter of FIG. 7 is of the type term a "dual flow" filter as described and claimed in commonly owned Brown et al U.S. Pat. No. 5,342,511 and in Cudaback et al U.S. Pat. No. 5,078,877. Filter systems of this type are often used in the lubrication system of large diesel engines, for example. As such, the filter elements themselves are often rather large, resulting in a canister which is also a rather large element. It has been common practice to manufacture relatively large filters of this type as in a conventional spin-on package. The spin-on package takes advantage of the sheet metal construction, and avoids the need for a large cast metal housing, which would be unduly expensive, difficult to make and far too heavy. However, the sheet metal housing of the spin-on cartridge needed to survive only one installation/removal cycle, following which it was discarded. It was not required to, nor was it capable of withstanding many years of life in a severe highly maintained environment such as a diesel power plant for a tractor trailer.

In accordance with the present invention, a filter system is provided which has a large size capable of containing a cartridge filter of adequate size to meet the lubrication requirements for a large diesel engine, which uses a replaceable filter cartridge, and which also employ a filter housing primarily of sheet metal rigidified and strengthened to function as a permanent, on the engine, filter housing.

FIG. 7 shows a filter system including a sheet metal shell 400, a two-element base 401 comprising first base member 401a and second base member 401b, with the base members being secured in an open end at the base of the shell 400. In the preferred embodiment, the base 401 carries a pair of center tubes 402, 403. The filter assembly in turn has two concentric cylindrical filters 405, 406 supported on the respective center tubes 402, 403. A cover 412 has a set of internal threads 413 which engage a mating set of threads 414 on a rigidifying threaded ring 415. An oil drain plug 416 is provided so that it can be withdrawn to drain oil from the housing before the cover is removed.

Figure 8:
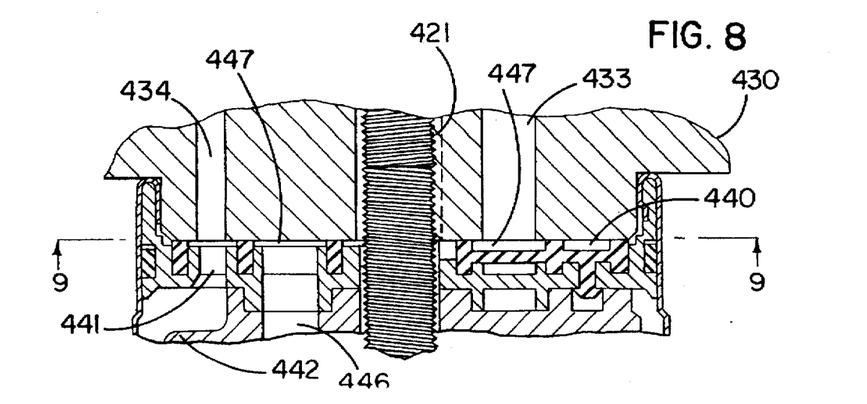
FIG. 8 is an enlarged partial view showing the connection between the filter of FIG. 7 and an engine.

Referring concurrently to FIGS. 7 and 8, it will be seen that the base member attaches much like the base member of the prior embodiment. A single center bolt 420 is provided which fits into a threaded aperture 421 in an engine schematically illustrated at 430. The engine layout is better illustrated in FIG. 9 and the threaded aperture 421 shown with an array of ports. The ports include central ports 432 which are associated with the threaded opening 421 and allow outlet flow of doubly filtered oil back to the engine crankcase. A cored arcuate slot 433 allows outlet flow of singly filtered oil to the engine. A similar arcuate port 434, but on a different center than the port 433, is cored in the engine, and allows inlet flow of unfiltered oil to the filter. A final smooth bore aperture 435 is provided for locating a torque pin, which prevents rotation of the filter housing on the engine.

A view of FIG. 9 will demonstrate the relative simplicity for the engine manufacture provided by the use of a filter according to the present invention. In contrast to use of the conventional spin-on canister, use of the present invention requires no supplemental parts be inserted on the engine prior to insertion of the filter housing itself. Using spin-on canisters, the engine would require certain apertures and ports, certain sealing faces for the gasket, and a threaded aperture in the center for receipt of a spud. However, in addition to those casting, cleaning, and machining operations which would need to be performed on the engine block in order to receive the filter, a further installation operation would be required to install and lock the spud in the threaded aperture in the engine block. That step is avoided in accordance with the present invention. It is simply necessary to core the slots 433, 434 and clean any casting or machining slag from those slots. It is necessary to drill the center hole 421 as well as the associated port slots 432, and tap the center hole 421. Finally, it is necessary to either cast or machine a relatively smooth bore straight sided aperture 435 for receipt of the torque pin. Elimination of the use of a spud, among the other simplifications provided by the present invention, is believe to present a cost savings of significance.

FIG. 8 shows the manner in which the engine 430 mates with the filter of FIG. 7. It will be seen that the inlet port 434 from the engine 430 communicates with a circumferential channel 440 at a particular radius from the filter center line. That port 440 ultimately communicates with the filter inlet port 441 so that oil flows through the port 441 past a flow diverter 442 and into an external chamber 443 (see FIG. 7) between the periphery of the housing of the shell 400 and the outer periphery of the outer filter cartridge 405. The majority of oil which passes through the outer filter cartridge 405 then flows through a port 446 to a circumferential channel 447 (see FIG. 8) in the base, and thereupon enters the outlet port 433 for return to the engine for lubrication of the engine. A portion of the flow which does not follow that path passes through the inner filter cartridge 406 and the inner center tube 403 to enter an internal chamber 450 defined on the inside of the inner center tube. Oil which flows to that inner portion thereupon exits the filter through small ports 451 drilled about the circumference of central aperture 452 in the base plate 401. The oil thereupon enters a channel 454 at the inner circumference of the filter housing and is passed through the aforementioned ports 432 (FIG. 9) to the engine where it is returned to the crankcase.

A securely positioned multi-segment gasket 460 is associated with the base plate 401 for defining and separating the channels which pass oil between the inlets and outlets of the filter and the engine. In effect, the filter provides the equivalent of three O-rings, an inner ring 461 separating outlet flow channel 454 from outlet flow channel 447, an intermediate ring 462 separating outlet flow channel 447 from the inlet flow channel 440, and an outer ring 463 for containing and defining the outer periphery of the inlet flow channel 440. The O-ring sections are connected by a plurality of radial webs spaced around the periphery of the gasket 460, the webs connecting the rings 461, 462 being identified at 465, and an outer set of webs 466 interconnecting the ring 462 and 463. In plan view, the ring has the appearance of a spider web, with the concentric rings being joined by webs, with the entire arrangement being set in slots as illustrated in FIGS. 7 and 8. Barbed projections 468 fit within apertures in the base plate 401 for further securing the gasket 460 in place.

Thus, to assemble the filter to the engine during engine manufacture, it is simply necessary to take the filter housing and position it over the mounting area of the engine. It is necessary to rotate the housing so that the anti-rotation pin 469 enters the aperture 435. Following that bolt 451 is inserted through the aperture 452, and a special long tool used to engage the head of the bolt, and rotate it into locked condition in the filter housing. Torquing of the bolt 451 serves to firmly draw the base plate 401 into the upper rolled lip of the canister, rendering even more secure the upper connection of those elements.

The manner in which the shell 400 is rigidified is very much like that illustrated in the prior embodiment. For example, the two component base plate 401 has a cylindrical flange 470 which extends outwardly at the outer periphery of the flange. The flange has an outwardly facing cylindrical channel 471 for receiving an O-ring gasket 472. The shell 400 has an upper portion 474 which is rolled about the end of the flange 470, and curved downwardly at 475 to firmly grip the flange 470 around its entire periphery. Apertures are formed in the flange (as by casting) at spaced intervals such as illustrated by the single aperture 476, and the end of the rolled portion 475 of the shell 400 is swaged into the apertured 476 to assure that the shell will not rotate on the base. It is recalled that the position will be either further secured by torquing of the mounting bolts 451 which draws the gasket 460 into firm contact with the engine base, but also draws the upper portion 470 of the flange into engagement with the engine.

Referring to the lower open end of the shell 400, it will be seen that the lower end is further rigidified by a threaded ring 415 which, like the previous embodiment, has an axially extending flange 480 directed along the axis of the shell 400 in the direction of the open end. The lower portion of the shell 400 is rolled at 481 to form a bead which encircles the nose of the flange 480. The formation of a continuous cylindrical bead forms a sealing surface 482 which is used to cooperate with a housing gasket, as will be described below. In addition, the continuous bead which firmly grips the nose 482 of the flange 480 tends to secure the ring 415 in position and rigidify the open end of the housing. As in the prior embodiment, a plurality of peripherally disposed indentations (see FIG. 5) are formed in the ring 414, and the outer portion of the shell swaged into those apertures to closely fit as illustrated in FIG. 5. The anti-rotation feature which is thus achieved has been described above. The rightmost flange 485 of the FIG. 7 showing illustrates the swaging for achieving the anti-rotation feature.

As in the prior embodiment, the cover 412 is a cast member, in which the thread 413 is cast to match the thread 414 of the cast threaded ring. Finger tabs 490 and a hex fitting 491 are provided in the cover for assisting in securing and removing the cover. The center tubes 402, 403, like those of the prior embodiment, are securely fixed in the base 401.

The filter cartridge itself is more completely disclosed in the aforementioned copending application. However, for the moment, suffice it to understand that the filter cartridge includes two concentric filter elements 405, 406. The filter is configured as a unidirectional device, having a suspended gasket 500 held in a first set of end caps 501 which are potted to and secured to the pleats of the filter media 405, 406. As in the prior embodiment, the suspended gasket 500 is connected to the end caps 501 by a continuous peripherally extending resilient flange 502 which seals the high pressure in the chamber 443 from the end cap 501. Thus, no compressive forces are applied to the filter media at the lower end cap. The upper end of the filter employs radial seals for the respective filter elements. The outer filter element 405 has an end cap 410 which carries an outer radial seal 411 which interfaces with a cylindrical flange 422 to seal the high pressure in the chamber 443 from the lower pressures IP at the interior of the outer center tube 402. Similarly, the inner filter media cartridge 406 has a cylindrical radial seal 417 which engages a flange 419 in the base member to protect an internal end cap 418 from the higher pressure. HP seen at the outer periphery of the filter element 406, and to maintain the end cap 418 at the lower pressure LP seen inside the center tube 403.

The present invention also has certain method aspects. Those involve the formation of a cylindrical filter housing of thin-walled drawn metal, but capable of continued and reliable use as a permanent housing. The method aspects include the steps of forming a thin walled sheet metal shell by drawing a metal blank to form a cylinder of desired diameter. In the preferred practice of the invention, the end of the drawn shell is removed, to create a cylinder open at both ends. The cylinder ends are rolled, preferably one inwardly and one outwardly. A bottom metallic formed member, preferably cast, is provided having a mounting aperture for securing the housing to the engine, a port arrangement complementary to a series of ports on the engine for communication of oil with the engine, and a downwardly extending rigidifying flange. The flange is fit within the rolled edge at one end of the cylinder, and the end is crimped or swaged to securely affix the formed metal member to the sheet metal housing, rigidifying the housing. A further formed metal element is provided, preferably a cast piece carrying threads for the open end of the cylinder. That member also has a flange, and the flange is fit within the outwardly rolled edge of the shell. Preferably, the threaded ring has anti-rotation notches, and the shell is swaged into those anti-rotation notches, so that the threaded ring both rigidifies the open end of the housing and also provides a closure thread at the open end which is firmly secured in an anti-rotation fashion to the open end. The so-formed housing can then be secured to the engine, preferably by a single bolt, and rendered ready for use. In the most preferred practice of the invention, the housing also includes a center tube arrangement fixed to the base member, and is used with disposable unsupported filter cartridges which obtain their radial support in use from the permanent center tube.

Certain advantages of the invention, as will be pointed out below, can be obtained even when using a removable canister which mounts to an engine on a more conventional base-type structure. The method aspects of the invention which apply directly to that involve the drawing of a thin-walled metal canister, in which one end of the canister remains closed. The open end of the canister has its edge rolled, preferably outwardly, and a flange of a threaded ring, as described in greater detail above, is fit within that rolled section to locate a closure thread at the open end of the housing and also to rigidify the open end. The threaded ring is fitted with anti-rotation notches, and the rolled edge of the canister is swaged into the anti-rotation notches to provide a canister which can be removed and reused as a permanent device.

The aforementioned copending patent applications disclose certain embodiments which utilize a closed end sheet metal canister into which a filter cartridge is inserted, before the canister with inserted filter cartridge is mounted to a mounting base on the engine. There is an aspect of the present invention which is applicable to that arrangement. More particularly, advantage is taken of the present invention by securing a cast metal ring having a threaded section and an axially extending flange, like the ring of FIG. 5, secured to the open end of the canister. Swaged connections 383 are also utilized, with the result being that a closed canister has an open end configured in accordance with the invention with a rigidifying member carrying external threads for allowing the canister to be secured to a threaded member mounted on the engine.

It will now be appreciated that what has been provided is an improved filter housing for automotive lubrication purposes. The housing is much lighter in weight, considering its size and lower in cost, than would be provided by a conventional cast housing. By contrast, the primary structural elements of the housing according to the invention are of thin drawn sheet metal not unlike the sheet metal used in spin-on canisters, but configured in such a manner as to render the housing made of sheet metal permanent and intended for continued reuse for the life of the engine between rebuilds. The thin-walled shell is rendered rigidified by judicious use of cast members, joined to the thin-walled shell in accordance with the teachings of the present invention, to provide a filter system which is efficient, which is light in weight, comparatively inexpensive to make and which can use filters which are entirely and readily disposable.

What is claimed is:

1. An oil filter housing comprising:
    a tubular thin-walled sheet metal shell defining an interior space of said housing and having an open base end and an open closure end;
    a shell base plate disposed inside the shell, the shell base plate including a cylindrical lip having a free end facing in a direction axially away from the interior space of said housing and defining an inlet port and at least one outlet port, the base end of said shell being rolled radially inwardly over the free end of the cylindrical lip of said shell base plate to form a mounting base rigidified by the shell base plate;
    a threaded metallic ring disposed outside the shell, the threaded metallic ring including a cylindrical lip having a free end facing in a direction axially away from the shell base plate, the closure end being rolled radially outwardly over the free end of the cylindrical lip of said threaded metallic ring to form the closure end of the shell rigidified by the threaded ring, the outwardly rolled edge forming a shell flange positioned with respect to the threaded ring for interfacing with a gasket; and
    a cover sized to close the closure end and having an internally threaded portion adapted to fit the threaded ring so as to secure the cover to the shell.

2. The combination as set forth in claim 1 wherein the lip of the threaded ring comprises a cylindrical flange fit within the outwardly rolled section at the closure end of the shell, anti-rotation indentations in the threaded ring at spaced angular locations about the periphery thereof, and the outwardly rolled section of the shell being swaged into the indentations for mounting the threaded ring in rotation-locked fashion on the shell.

3. The combination as set forth in claim 1 wherein the shell base plate further includes a threaded fastener projecting through a central aperture in the shell base plate adapted to fit a threaded aperture for securing the shell to an engine.

4. The combination as set forth in claim 3 wherein the engine is provided with an inlet oil port in the form of an arcuate opening, and a filtered oil return through said threaded aperture, the shell base carrying a retained base plate gasket sealing the arcuate opening from the filtered oil return.

5. The combination as set forth in claim 4 wherein the base plate gasket assembly has barbed projections engaged in apertures in the base plate, the barbed projections being positioned to prevent the displacement of said base plate gasket during assembly of the filter housing on the engine.

6. The combination as set forth in claim 3 wherein the central aperture defines said at least one outlet port for oil flow between the engine and filter housing.

7. The combination as set forth in claim 3 wherein the shell base plate includes an anti-rotation pin, and the engine has an aperture for receiving the anti-rotation pin and preventing rotation of the housing after the fastener locks the housing to the engine.

8. The combination as set forth in claim 7 in which the inwardly rolled end of the shell at the base end has portions which interfit a plurality of peripherally spaced indentations in the shell base plate, thereby to provide an anti-rotation lock of the shell base plate to the shell.

9. The combination as set forth in claim 1 wherein the cover further includes a removable oil drain plug for draining oil from the housing before removing the cover.

10. The combination as set forth in claim 1 further including an O-ring gasket interposed between the shell base plate and the shell, the shell having a stepped section in the outer periphery thereof creating a smaller diameter portion at the base thereof for securely gripping the shell base and compressing said O-ring gasket.

11. The combination as set forth in claim 1 further including a filter cartridge insertable into the shell carrying a radially projecting annular suspended gasket, the suspended gasket when the filter cartridge is inserted into the shell disposed adjacent the shell flange and remaining adjacent the shell flange as the cover is positioned over the shell and rotated into a secured position.

12. The combination as set forth in claim 11 wherein the shell base plate further includes a permanent center tube mounted to the shell base plate and having perforations for allowing the passage of oil through the center tube, the center tube being sized to accept an inner periphery of the filter cartridge for supporting the filter cartridge against radial crushing.

13. The combination as set forth in claim 12 wherein the shell base plate has an annular cylindrical flange projecting into the shell, and the filter cartridge has end caps and a radial seal gasket in the form of an extending elastomeric cylinder of a size adapted to seal with an outer cylindrical surface of the annular flange, the radial seal gasket being positioned to prevent leakage from a higher pressure region at the outer periphery of the filter cartridge.

14. The combination as set forth in claim 13 wherein the shell base plate includes a flow diverter interposed in a path of oil flow from said inlet port for preventing direct flow onto an interface at the junction between the radial seal gasket and the flange.

15. The combination as set forth in claim 11 in which the cover has an annular sealing surface and an axial resilient gasket projects axially from the cartridge, the resilient gasket cooperating with the annular sealing surface when the cover is secured in position to form an axial seal, the cover and filter providing a path for communication of a lower pressure at a region within the filter cartridge to the axial gasket, whereby higher pressure at the outer periphery of the filter cartridge forces the axial gasket into sealing relationship without imposing axial crushing loads on the filter cartridge.

16. The combination as set forth in claim 11 wherein the shell base plate includes two center tubes, the filter cartridge having two concentric cylindrical filter media elements including an outer element and an inner element, radial seals on a first end of both filter elements radially engaging cylindrical flanges in the housing and axial seals on a second end of both filter elements axially engaging an annular sealing surface of the cover when the cover is secured in position, the axial seals being disposed near the outer peripheries of the respective filter elements to cause pressure at the respective outer peripheries to engage the axial seals and load the associated filter element in tension.

17. The combination as set forth in claim 16 wherein the filter cartridge carries the suspended gasket outboard of the outer element and displaced therefrom in a position to engage said shell flange when the filter cartridge is inserted into the shell, thereby to be automatically positioned to seal between the shell flange and the cover when the cover is rotated into place.

* * * * *